United States Patent [19]

Hermans et al.

[11] 4,194,014
[45] Mar. 18, 1980

[54] METHOD FOR ADJUSTABLY HEATING A LIQUID

[75] Inventors: Willem F. Hermans, Amstelveen; Louwrens J. van Eijk, Nieuw-Vennep, both of Netherlands

[73] Assignee: Stork Amsterdam B.V., Amstelveen, Netherlands

[21] Appl. No.: 865,264

[22] Filed: Dec. 28, 1977

[30] Foreign Application Priority Data

Dec. 30, 1976 [NL] Netherlands .................. 7614605

[51] Int. Cl.$^2$ ..................... A23L 3/00; A23C 3/02
[52] U.S. Cl. ............................. 426/231; 99/453; 426/521
[58] Field of Search .......... 426/521, 522, 231, 232; 21/2, 56, 93, 95, 96, 97; 99/453, 468, 474, 483, 486, 487

[56] References Cited

U.S. PATENT DOCUMENTS

| | | | |
|---|---|---|---|
| 2,021,899 | 11/1935 | Schneider | 426/522 X |
| 2,846,320 | 8/1958 | Wittwer | 99/468 X |
| 2,975,069 | 3/1961 | Laguilharre | 426/522 |
| 3,101,041 | 8/1963 | Hallstrom | 99/468 |
| 3,150,713 | 9/1964 | Loliger | 426/232 X |

FOREIGN PATENT DOCUMENTS 501368  2/1971  Switzerland .................. 426/522

OTHER PUBLICATIONS

Hall et al.; Milk Pastuerization; AVI Publishing Co. Inc., Westport, Conn. 1968; pp. 73-83, 148-158.
Hanrahan et al.; Our Industry Today; Journal of Dairy Science, 1/1963, vol. XLVI, No. 1, pp. 69-72.

*Primary Examiner*—Kenneth M. Schor
*Attorney, Agent, or Firm*—Blanchard, Flynn, Thiel, Boutell & Tanis

[57] ABSTRACT

A method and apparatus for the thermal treatment of a liquid, in particular for the sterilization of milk, in which said liquid is brought to a predetermined temperature and pressure, means being provided for a rapid adaptation of the heat supply dependent upon both the temperature of the treated liquid and the supply rate of the fresh liquid.

2 Claims, 2 Drawing Figures

METHOD FOR ADJUSTABLY HEATING A LIQUID

BACKGROUND OF THE INVENTION

The invention relates to a method for heating a liquid product flowing through a conduit by means of a medium, wherein the product successively is conveyed under overpressure to a heating apparatus, subsequently passes through an insulated dwelling stretch and then, through an adjustable throttle valve, arrives in an expansion vessel from which the treated product is discharged. Such a method is known per sé and is widely practised in the dairy and food products industry. Thereby two systems can be discerned, to wit an indirect heating system while utilizing a heat exchanger and a direct heating system by means of an injection of steam into the product.

A drawback of the known methods is, however, that the capacity cannot or hardly be altered without the treating temperature in the dwelling stretch thereby exhibiting inadmissible fluctuations. The cause of this is the fact that the actual process proceeds very rapidly and is also dependent on the ratio of product mass flow to heating medium mass flow and on the pressure at which the heating takes place. Moreover, there is the additional phenomenon of dynamic instability of the process, i.e. as soon as the ratio of product mass flow to medium mass flow alters, this ratio, and with it the heating temperature, instead of being reinstated, still further alters.

SUMMARY OF THE INVENTION

The invention aims to provide a method which is founded on a specific combination of several control systems by which an alteration in the amount of product being supplied reacts so rapidly on the amount of heating medium being supplied that the inevitably occurring temperature fluctuations are kept within very narrow limits. According to the invention, this is achieved in that:
  the amount of product supplied to the heating apparatus per unit of time is measured;
  the supply pressure of heating medium is measured;
  the temperature and pressure of the product contained in the dwelling stretch is measured;
  the control of the amount of heating medium which is supplied to the heating apparatus per unit of time occurs in dependence of both the measured amount of supplied product and the measured product temperature;
  the control of the supply pressure of the heating medium is performed in dependence of the measured amount of supplied product;
  the adjustment of the throttle valve takes place such that the product pressure in the dwelling stretch remains at a constant value in spite of alteration in amount of supplied product.

If this method is applied to an apparatus for heating or sterilizing liquid food products several filling machines can be simultaneously supplied with the sterilized product without interposing a sterile buffer tank. Then, in the event of one or more of these filling machines temporarily dropping out, the amount of product to be treated can subsequently be adapted to the capacity required at that moment.

In order to increase the stability of the method a control is added thereto, that is to say that the supply pressure of the heating medium is measured and is controled in dependence of the measured amount of supplied product. Just like in the above-mentioned control, the method according to the invention amounts to the employment therein of a so-called "external set point" which is automatically adjusted in dependence of the amount of product flowing through. The relation between the amount and the pressure of the heating medium and the amount of product passed can be preselected at will and can be built-in in the control circuits.

Since, particularly in sterilization processes, the effect of a heat treatment is obtained by a combination of dwelling time and heating temperature, such that according to an increase in the dwelling time the temperature is allowed to decrease, the invention at the same time provides for the possibility of causing the temperature in the dwelling stretch to either increase or decrease in the event of an increase or decrease in the amount of product being supplied and the corresponding decrease or increase of the dwelling time in that stretch resulting therefrom.

If this method is applied to an apparatus for heating liquid food products in this manner the process value, also referred to as "lethality" expressed in $F_0$-units or "sterilizing effect" can be kept at a constant value in spite of alterations in the amount of product to be treated. This property of the system is called "Constant $F_0$ Control".

The invention is also embodied in an apparatus for thermally treating (pasteurizing of sterilizing) a liquid product in a closed system, which installation comprises a store tank for the product to be treated, a pump, a heating apparatus, a supply of heating medium, a dwelling stretch, an adjustable throttle valve and an expansion tank with a product-outlet. This apparatus comprises:
  a first device for measuring the amount of product conveyed per unit of time;
  a second device for measuring the supply pressure of the heating medium to be supplied to the product;
  a third device for measuring the temperature of the product in the dwelling stretch;
  a fourth device for measuring the pressure of the product in the dwelling stretch;
in combination with:
  a first device for controling the supply pressure of medium to be supplied to the heating device which control device is equipped with an external set point which is continuously adjusted by the signal emanating from the first measuring device, the control device further being connected to the second measuring device;
  a second device for controling the amount of medium to be supplied to the heating device, which control device is also equipped with an external set point which is continuously adjusted by the signal emanating from the first measuring device, the control device further being connected to the third measuring device;
  a third device for controling the position of the throttle valve, which device is connected to the fourth measuring device.

BRIEF SURVEY OF THE DRAWINGS

DESCRIPTION OF A PREFERRED EMBODIMENT

Figure 1:
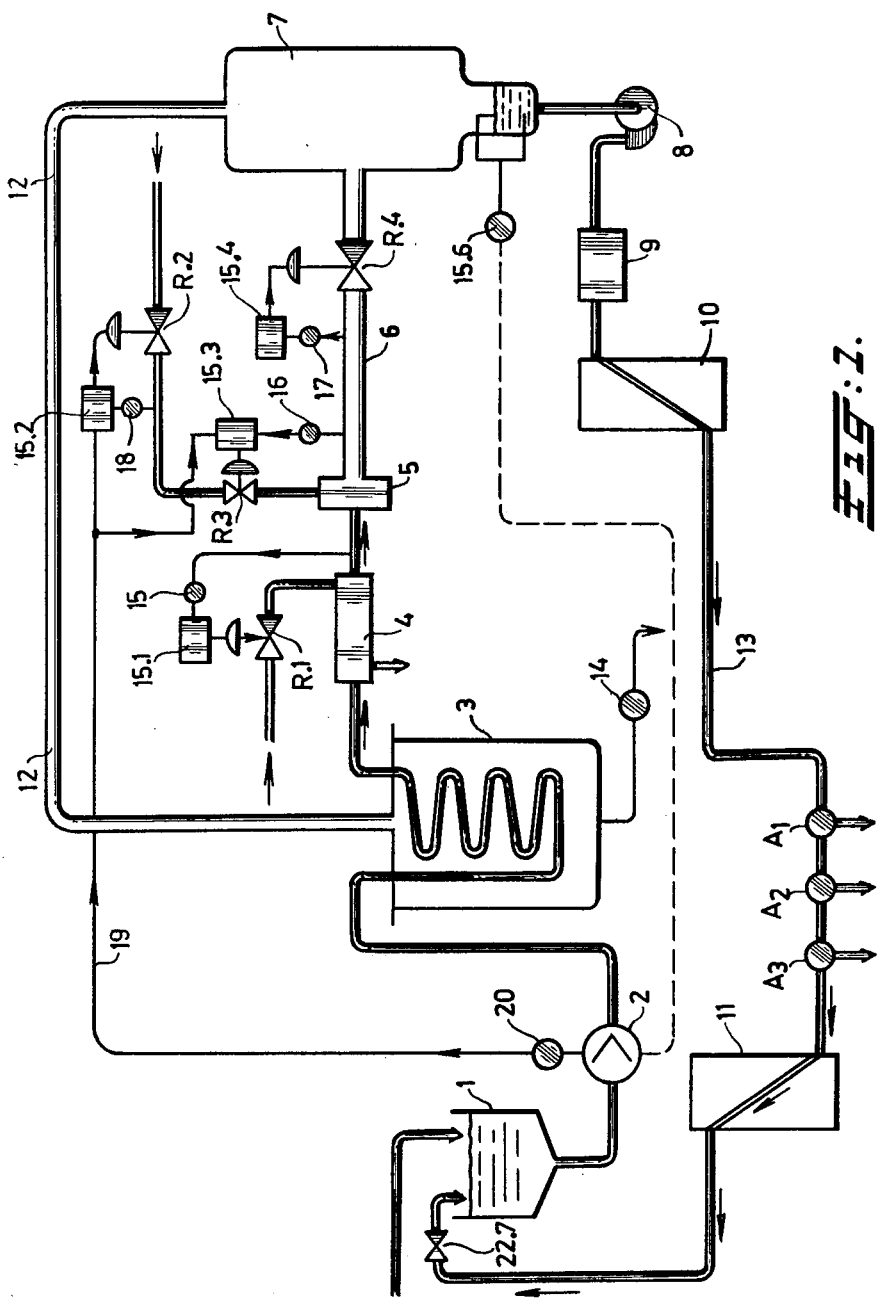
FIG. 1 shows a general view of the entire apparatus in which a direct system by steam injection is employed.

The product to be treated such as for instance milk, custard, babyfood, infusion liquid and the like is stored in a float tank 1. A pump 2 passes the product to a heat exchanger 3 which is constructed as a so-called regenerative condenser. Thereupon the product passes through a preheater 4 and finally arrives in the heating device 5, which in the embodiment of FIG. 1 is shown as a conventional steam injector, that is to say the apparatus operates with direct injection of steam in the product. The apparatus 5 is followed by a dwelling stretch or steam chamber 6 which may have the form of a small vessel or a tube. The purpose of the stretch 6 is to keep the product at the desired sterilization or pasteurization temperature for a sufficiently long time.

The steam introduced into the heating device 5 condensates and the mixture of product and condensated steam takes on the required and continuously adjustable sterilization or pasteurization temperature. Under the given circumstances a pressure will be maintained which lies 0.5 to 2.0 atmospheres above the abmient vapour tension. The outlet of the stretch 6 is formed by an adjustable throttle valve R.4 which opens on an expansion vessel 7 into which the said mixture flows. The pressure in this tank is kept at such a value that by partial evaporation of the discharging mixture the same amount of vapour is withdrawn from the product as has been added thereto in the injector 5. The product temperature falls to about the same value as that which the product had in the piping between the preheater 4 and the heating device 5.

The liquid level in the expansion vessel 7 is adjusted to a constant value by a conventional level adjusting device 15.6. The liquid product is discharged through a germ-free acting centrifugal pump 8 into an also germ-free acting homogeniser 9. Then, after having passed through a heat exchanger 10, the product enters a ring main 13 provided with one or more valves A1, A2 and A3 which, in open position, admit the product to the filling machines (not shown). The excess capacity of the product proceeds through the ring main to a return reservoir 11 and thence through a throttle valve 22.7 back to the float tank 1.

In the expansion vessel 7 an amount of vapour is liberated which can flow to the heat exchanger 3 through a pipe 12. The vapour condensates in this heat exchanger and the condensate is drained off by a pump 14. Warming up the product in the preheater 4 takes place indirectly by means of steam which is admitted through a valve R.1. The position of this adjustable valve is adjusted through a control device 15.1 which receives a signal from a temperature measuring device 15 connected to the connecting pipe between the preheater 4 and the steam injector 5.

The dwelling stretch or steam chamber 6 has further connected thereto a device 16 for measuring the temperature and a device 17 for measuring the pressure of the product contained therein. Both these measuring devices play a part in adjusting the apparatus to a change of capacity. Steam is supplied to the injector 5 through two successive valves R2 and R3. The position of these valves is controled by control devices 15.2 and 15.3, respectively. The valve R2 determines the supply pressure of the steam, which pressure is measured by a device 18 connected to the connecting line between the valves R2 and R3. The output signal of this measuring device 18 is directed to a control device 15.2. A control device 15.3 receives a signal from the measuring device 16 and adjusts the valve R3 in such a way that the correct amount of steam is supplied to the injector 5 for attaining the desired temperature within the stretch 6.

The provision which is at issue in the present invention consists of a connection 19 with the pump 2. This pump is provided with a device 20 for measuring the amount of product passed per unit of time. The signal from this device 20 is passed, through the connection 19, first of all to the control device 15.3 and also to the control device 15.2.

The control of the temperature in the dwelling stretch 6 is effected as follows. The device 16 measures the temperature of the product after it has been mixed with steam. From this, through the control device 15.3 the required position of the valve R3 is determined. An important source of disturbance is constituted by an alteration in the mass flow of the product passed through the elements 5 and 6, which alteration is measured by the device 20. The control device 15.3 now, is connected to the connecting line 19, this control device being provided with a so-called "External set point". This means that the adjusted value is determined by an external quantity, in this instance the product mass flow. This results in the control immediately reacting on an alteration in the capacity of the mass flow, as opposed to the conventional control which does not make use of the connecting line 19 and of this external set point.

Another important source of disturbance is the steam pressure in the connection between the valves R2 and R3. Should the steam pressure alter in a certain position of the valve R3, this directly affects the amount of steam let through. In order to eliminate this disturbance the control device 15.2 has been provided which is also connected to the connecting line 19 and is also equipped with an external set point. This set point is controled by the signal from the device 20 in such a manner that at an alteration of the product mass flow, the steam pressure in the connection between the valves R2 and R3 at the same time so alters that the last mentioned valve does not or scarcely has to alter its position in order to let through the correct amount of steam, also during this alteration in capacity resulting in a pressure increase of the product in the dwelling stretch.

Another source of disturbance is an alteration in the pressure in the stretch 6. In order to eliminate this disturbance the measuring device 17 and the control device 15.4 are provided. For ensuring the constancy of the contemplated treatment in the injector 5 and the steam chamber 6, therefore, three control devices are operative. The devices 15.2 and 15.4 control a pressure and are capable of adjusting very rapidly, whereas the device 15.3 controls the temperature and therefore may be somewhat slower. The advantage of this control system as a whole is that it is stable and that particularly the valve R3 can be so adjusted that it can operate in the most favourable range of its characteristic curve.

Since the temperature at which the product leaves the preheater 4 should also be controled very accurately and is not allowed to deviate from the adjusted value during variations in the capacity of the mass flow, the same principle of control system could also be applied to this preheater temperature. In practice, however, it is found that the simple control illustrated in FIG. 1, in consequence of the indirect preliminary heating, satisfies the requirement of accuracy.

The following example is an indication of the temperatures which may occur in the system during sterilization or pasteurization.

|  | During sterilization | During pasteurization |
|---|---|---|
| Float tank 1 | 5°–15° C. | 5°–15° C. |
| After heat exchanger 3 | 40°–45° C. | 35°–40° C. |
| After preheater 4 | 80°–85° C. | 70°–80° C. |
| After steam injector 5 | 145°–150° C. | 115°–135° C. |
| After expansion vessel 7 | 80°–90° C. | 70°–80° C. |
| After heat exchanger 10 | 20° C. | 20° C. |

Figure 2:
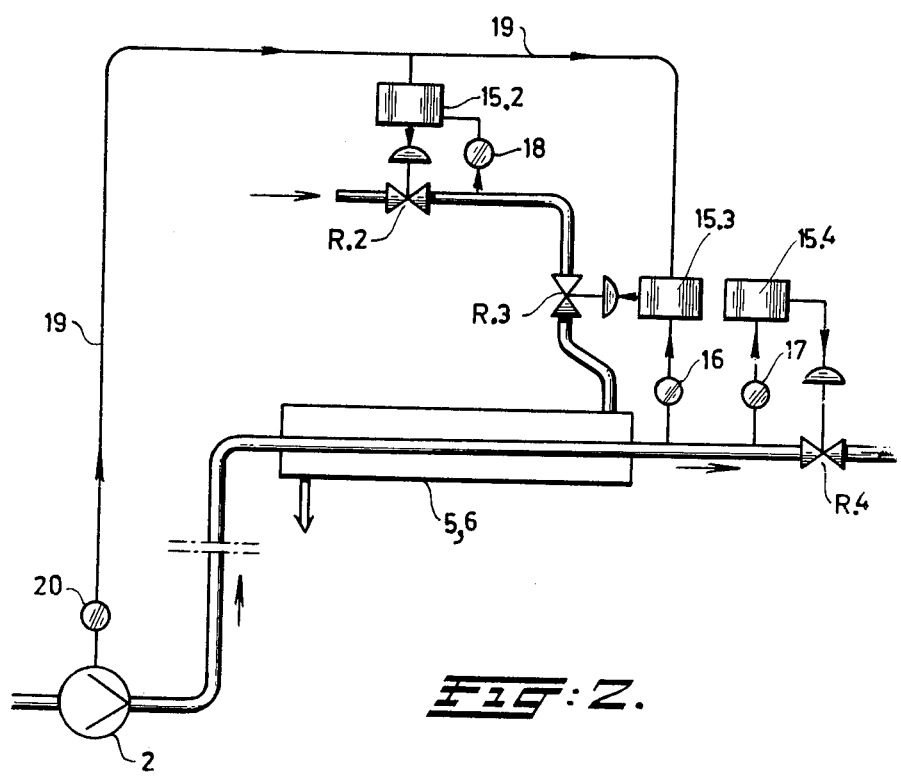
FIG. 2 is a detail on a larger scale of an apparatus with an indirect heating system.

In FIG. 2 the control system is illustrated on a somewhat enlarged scale while utilizing indirect heating with the elements 4 and 5 being combined. Here, likewise, the connecting line 19 plays an important part, this connection again being provided for the control devices 15.2 and 15.3.

What is claimed is:

1. In a method for sterilizing or pasteurizing a liquid food product, wherein the product is heated by a heating medium as it flows through a heating device, with the heated product passing successively through an insulated dwelling stretch so as to effect the desired sterilization or pasteurization of said product in said dwelling stretch and then through a throttle valve into an expansion vessel from which the treated product is discharged, the improvement comprising the steps of:

measuring the amount of product supplied to the heating device per unit of time;

measuring the pressure of the heating medium as supplied to said heating device;

measuring the temperature of the product within the dwelling stretch;

measuring the pressure of the product in the dwelling stretch;

controlling and adjusting the amount of heating medium which is supplied to the heating device per unit of time in dependence on both the measured amount of product supplied to the heating device and the measured temperature of the product within the dwelling stretch;

controlling the pressure of the heating medium as supplied to the heating device in dependence on the measured amount of supplied product and the measured pressure of the heating medium; and adjusting the throttle valve so that the measured product pressure in the dwelling stretch remains at a constant value irrespective of alterations in the amount of supplied product.

2. The method of claim 1, wherein the control of the amount of heating medium which is supplied to the heating device is adapted to the product supply such that the relation between dwelling time and temperature of the product in the heating device remains at a constant value.

* * * * *